Patented Jan. 13, 1931

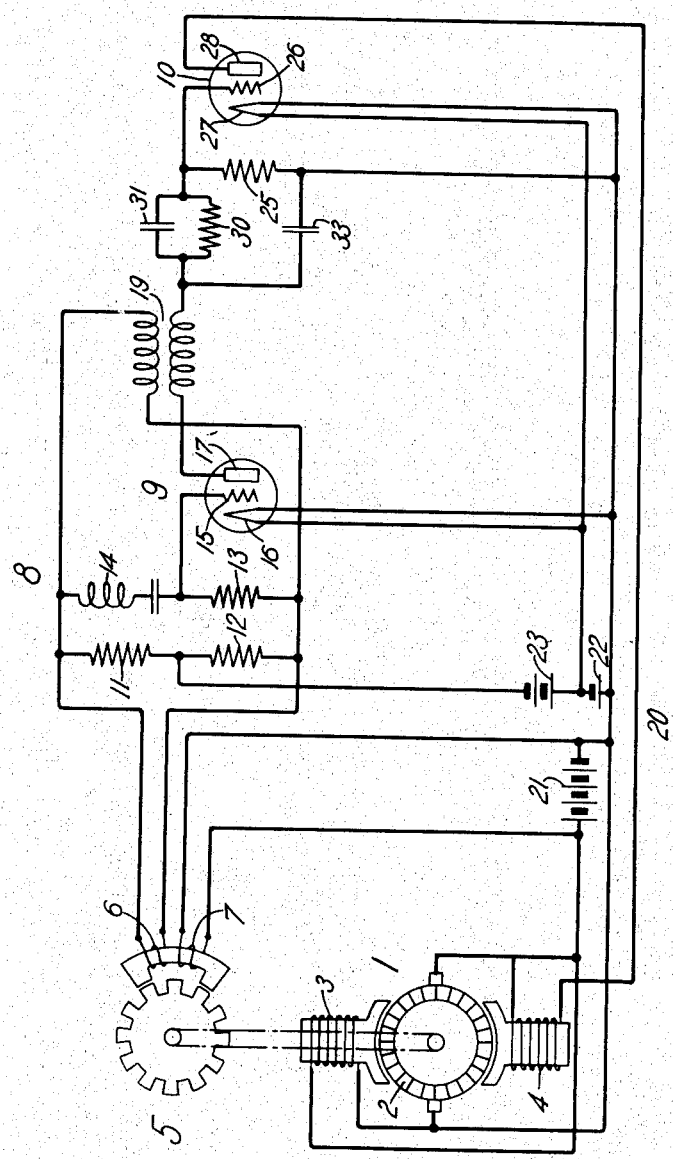

1,788,734

UNITED STATES PATENT OFFICE

EDMUND R. MORTON, OF BROOKLYN, NEW YORK, ASSIGNOR TO BELL TELEPHONE LABORATORIES, INCORPORATED, OF NEW YORK, N. Y., A CORPORATION OF NEW YORK

REGULATOR SYSTEM

Application filed April 30, 1929. Serial No. 359,218.

This invention relates to regulator systems which operate with precision and particularly to precision regulator systems which operate without hunting action.

One object of the invention is to provide a regulator system that shall develop a relatively large corrective force upon tendency of the characteristic being held constant to change and gradually reduce the corrective force to prevent hunting action.

Another object of the invention is to provide a regulator system for a dynamo-electric machine that shall maintain a characteristic of the machine constant and that shall produce a relatively large corrective force, upon tendency of the characteristic to change, which is gradually reduced to prevent hunting action.

A further object of the invention is to provide a motor speed regulator system having vacuum tube circuits for controlling the field excitation of the motor to maintain the speed thereof constant that shall apply a relatively large corrective excitation to the motor field winding upon tendency of the motor speed to change and gradually reduce the corrective excitation of the motor field winding to prevent hunting action.

In controlling motors with precision to maintain the speed thereof constant, as for example in sound picture systems, it is desirable to have the regulator very sensitive to tendencies of the motor to change speed and operate in a manner to prevent any hunting action on the part of the regulator. In a regulator system having no moving parts and employing space discharge devices very sensitive and quick regulation may be obtained but auxiliary means must be provided in such systems if hunting action is to be prevented.

In the system used to disclose the invention space discharge devices are employed for controlling the excitation of a motor to maintain the speed thereof constant and means are employed to insure against hunting action. In the disclosed system a motor is directly connected to an inductor alternator which produces an alternating current having a frequency varying according to the speed of the motor. The inductor-alternator is connected to two opposite vertices of a Wheatstone bridge circuit having one arm thereof tuned to the frequency of the alternator when the motor is operating at normal speed. A phase detector tube has the input circuit thereof connected to the vertices of the Wheatstone bridge circuit opposite to the vertices connected to the alternator. Alternating potential is supplied to the plate of the phase detector tube from the inductor-alternator. The phase detector tube is operated in accordance with the phase relation between the potential impressed upon the grid from the Wheatstone bridge circuit and the potential impressed upon the plate from the alternator. The phase of the potential impressed upon the grid from the Wheatstone bridge circuit varies in accordance with the frequency of the alternator current so that the output from the phase detector tube varies in accordance with the speed of the motor. Systems of this type are disclosed in the patent to H. M. Stoller, No. 1,695,035, dated December 11, 1928, in the patent to H. M. Stoller No. 1,711,661, dated May 7, 1929 and in the application of H. M. Stoller et al, Serial No. 307,139, filed September 20, 1928.

The phase detector tube is coupled to a thermionic amplifier by means of a resistance element. The amplifier tube is directly connected to a regulating field winding of the motor for controlling the motor field excitation to maintain the motor speed constant. In the output circuit of the phase detector tube is provided means for stabilizing the regulating action to prevent hunting action. The means for stabilizing the regulating operation comprises a resistance shunted by a condenser of relatively large capacity. The condenser which shunts the resistance element permits the full potential from the plate of the phase detector tube to be applied to the grid of the amplifier only during a transient or sudden change in the output from the phase detector tube. When the output from the phase detector tube is steady and constant the power applied to the amplifier tube is limited by the resistance element which is shunted by the condenser.

If the speed of the motor tends to decrease, the anti-hunting means, comprising the resistance element shunted by the condenser, serves to effect a sudden decrease in the motor field excitation to compensate for the tendency to lower the speed thereof. The discharge of the condenser gradually lowers the compensating excitation applied to the field winding. If the speed of the motor tends to increase, the anti-hunting means applies a sudden increase in the field excitation of the motor to oppose the tendency of the motor to increase in speed. The compensating excitation is gradually reduced to hold the motor in a steady operating state.

The single figure in the accompanying drawing is a diagrammatic view of a regulator system constructed in accordance with the invention.

Referring to the drawing, a motor 1 comprising an armature 2, a shunt field winding 3 and a regulating field winding 4 is directly connected to an inductor-alternator 5. The inductor-alternator 5 is provided with an armature winding 6 and a field winding 7. The alternator, being directly connected to the motor 1, will produce an alternating current having a frequency varying according to the speed of the motor.

The excitation of the regulating field winding 4 is controlled by the alternator 5 operating through a Wheatstone bridge circuit 8, a phase detector tube 9 and a regulator tube 10 serving as an amplifier. The Wheatstone bridge circuit 8 comprises three resistance arms 11, 12 and 13 and an arm 14 in the form of a tuned circuit. The bridge arm 14 is tuned to the frequency of the alternator 5 when the motor is operating at normal speed. Two opposite vertices of the bridge circuit are connected across the armature winding 6 of the alternator 5. The two other vertices of the Wheatstone bridge circuit are connected to the input circuit of the phase detector tube 9.

The phase detector tube 9 comprises a grid element 15, a filament or cathode 16 and a plate or anode 17. Alternating potential from the armature winding 6 of the alternator is applied to the plate 17 of the phase detector tube by means of a transformer 19. A battery 20 divided into sections 21, 22 and 23 is provided for operating the motor, for exciting the inductor-alternator and for operating the phase detector tube 9 and the amplifier tube 10. It is to be understood that any other suitable source of current may be provided for operating the system if so desired.

The battery section 21 supplies current to the motor armature 2, the motor shunt field winding 3 and the alternator field winding 7. The battery section 22 supplies filament current to the phase detector tube 9 and the battery section 23 provides biasing potential for the grid 15 of the phase detector tube 9.

The phase detector tube 9 is coupled to the thermionic amplifier tube 10 by means of a resistance element 25. The phase detector tube impresses a potential upon the coupling resistance 25 which varies in accordance with the phase relation between the potentials impressed upon the grid and plate of the detector tube and upon the amplitude of the potential applied to the grid. The phase relation between the potentials on the grid and plate of the phase detector tube varies in accordance with the frequency of the current impressed upon the Wheatstone bridge circuit and in accordance with the speed of the motor. A more detailed description of the operation of a similar system employing a Wheatstone bridge circuit is given in the patent to H. M. Stoller, No. 1,695,035, dated December 11, 1928, and the patent to H. M. Stoller, No. 1,711,661, dated May 7, 1929.

The amplifier tube 10 comprises a grid element 26 a filament 27 and a plate 28. Filament current for the amplifier is supplied by the battery section 22 and plate current is supplied by the battery section 21. The output circuit of the amplifier tube is connected to the regulating field winding 4 of the motor 1.

If the speed of the motor 1 tends to increase the frequency of the current developed by inductor-alternator 5 increases. The increase in frequency of the alternator current varies the phase relation of the potential impressed upon the grid 15 with respect to the potential impressed upon the plate 17 of the phase detector 9 to lower the output voltage impressed upon the coupling resistance 25. The lowering of the potential across the coupling resistance 25 lowers the negative biasing potential on the grid 26 of the amplifier tube to increase the current supplied by the amplifier tube to the regulating field winding 4. The increased excitation of the field winding 4 opposes the tendency of the motor to increase in speed.

If the motor 1 tends to decrease in speed the frequency of the current developed by the inductor-alternator 5 is lowered. The phase relation between the potentials on the grid and plate of the phase detector tube are so varied as to increase the output voltage from the phase detector tube impressed on the coupling resistance 25. The negative biasing potential on the grid 26 of the amplifier tube is increased to lower the current flow through the amplifier tube and the excitation of the regulating field winding 4. The decreased excitation of the regulating field winding opposes the tendency of the voltage to decrease in speed.

A regulator system constructed as above set forth will operate in a very sensitive manner but may have a tendency to hunt unless some auxiliary means is provided for opposing said tendency. In accordance with the present invention a resistance element 30 shunted by a relatively large capacity condenser 31 is provided in the output circuit of the phase detector tube 9. Upon tendency of the motor to change speed a relatively large corrective excitation is applied to the regulating field winding 4 by the anti-hunting means to immediately oppose such tendency of the motor to change speed. The corrective excitation applied to the regulative field winding is gradually reduced as the condenser 31 discharges. The rate at which the corrective excitation is reduced may be controlled by varying the size of the condenser 31. If so desired a relatively small condenser 33 may be connected across the resistance elements 30 and 25 to by-pass the high frequency components of the phase detector output.

If the motor 1 tends to increase in speed the output from the phase detector tube 9 is suddenly lowered. The rapid change in the output from the phase detector tube is transmitted directly through the condenser 31 to the coupling resistance 25. The potential across the coupling resistance 25 is thus suddenly reduced, lowering the negative bias on the grid 26 of the amplifier tube 10 to immediately apply a corrective excitation to the regulating field winding 4 of the motor. The condenser 31 gradually discharges and the output from the phase detector tube 9 is impressed on coupling resistance 25 through the resistance element 30. This reduces the corrective excitation which had been applied to the motor 1 upon tendency thereof to change in speed.

If the motor tends to decrease in speed the output of the phase detector tube is suddenly increased. The sudden increase in the output from the phase detector tube is transmitted immediately through the condenser 31 to the coupling resistance 25. The sudden increase in potential impressed across the coupling resistance 25 operates the amplifier tube 10 to decrease the excitation of the regulating field winding 4 to oppose the tendency of the motor to change in speed. The condenser 31 gradually discharges so that the output from the phase detector tube is impressed on the coupling resistance 25 through the resistance element 30. Thus the corrective excitation which was first impressed upon the regulating field winding 4 is gradually reduced to a steady state.

Modifications in the system and in the arrangement and location of parts may be made within the spirit and scope of the invention and such modifications are intended to be covered by the appended claims.

What is claimed is:

1. In a regulator system, a dynamo-electric machine, and electrical regulating means for controlling said machine to maintain a characteristic thereof constant, said means comprising auxiliary means having a capacity element for immediately applying a relatively large corrective force to said machine upon tendency to change in the characteristic thereof to return the characteristic to normal and for gradually reducing the corrective force.

2. In a regulator system, a motor having a regulating field winding, and means for controlling said field winding to maintain the motor speed substantially constant, said means comprising auxiliary means having a capacity element for applying a relatively large corrective excitation to said field winding upon tendency of the motor to change speed and for gradually reducing the corrective excitation.

3. In a regulator system, a motor having a regulating field winding, means comprising a three-element space discharge device operated according to the motor speed for controlling said field winding to maintain the motor speed constant, and means comprising a resistance element shunted by a condenser in the output circuit of said space discharge device for applying a relatively large corrective excitation to said field winding upon tendency of the motor to change speed and for gradually reducing the corrective excitation.

4. In a regulator system, a dynamo-electric machine, means comprising a three-element space discharge device operated according to a characteristic of said machine for controlling the machine to maintain the characteristic thereof constant, and means comprising a resistance element shunted by a condenser in the output circuit of said space discharge device for applying a relatively large corrective force to said machine upon tendency to change in the characteristic thereof to return the characteristic to normal and for gradually reducing the corrective force.

5. In a regulator system, a motor having a regulating field winding, a source of alternating current having a frequency varying according to the motor speed, means comprising a three-element space discharge device for controlling the excitation of said field winding according to the frequency of said alternating current to maintain the motor speed constant, and means comprising a condenser connected in shunt to a resistance in the output circuit of said device for immediately applying a large corrective excitation to said field winding upon tendency of the motor to change speed and for gradually reducing the corrective excitation.

6. In a regulator system, a dynamo-electric machine, regulating means comprising control circuits for governing said machine to maintain a characteristic thereof constant, and a resistance element shunted by a condenser in said control circuits for immediately applying a relatively large corrective force to said machine upon tendency to change in the characteristic thereof to return the characteristic to normal and prevent hunting action.

7. In a regulator system, a motor having a regulating field winding, means comprising control circuits for governing said field winding to maintain the motor speed constant, and a resistance element shunted by a condenser in said control circuits for immediately applying a relatively large corrective excitation to said field winding upon tendency of the motor to change speed and prevent hunting action.

8. In a regulator system, a dynamo-electric machine, regulating means comprising vacuum tube circuits for controlling said machine to maintain a characteristic thereof constant, and auxiliary means comprising a condenser in shunt to a resistance in said vacuum tube circuits for immediately applying a relatively large corrective force to said machine upon tendency to change in the characteristic thereof to return the characteristic to normal value and for gradually reducing the corrective force.

9. In a regulator system, a dynamo-electric machine, a three-element space discharge device, means for operating said device according to a characteristic of said machine, means comprising an amplifier coupled to said space discharge device for controlling said machine to maintain the characteristic thereof constant, and means in the output circuit of said space discharge device and directly controlling said amplifier for applying a relatively large corrective force to said machine upon tendency to change in the characteristic thereof to return the characteristic to normal and for gradually reducing the corrective force.

10. In a regulator system, a motor having a regulating field winding, a pilot generator operated by said motor, regulating means comprising vacuum tube circuits operated by said generator for controlling said field winding to maintain the motor speed substantially constant, and means comprising a resistance element shunted by a condenser inserted in the vacuum tube circuits for effecting a sudden change in the excitation of said field winding upon tendency of the motor to change speed to temporarily anticipate the operation of the regulating means.

11. In a regulator system, a motor having a regulating field winding, a source of alternating current having a frequency varying according to the motor speed, a three-element phase detector tube, means for operating said phase detector tube according to the frequency of the current from said source, a three-element space discharge amplifier coupled to said detector tube for controlling said field winding to maintain the motor speed constant, and means in the plate circuit of said detector tube for controlling said amplifier tube to apply a relatively large corrective field excitation upon tendency of the motor to change speed and to gradually reduce the corrective excitation.

12. In a regulator system, a dynamo-electric machine having a regulating field winding, a source of alternating current having a frequency varying according to a characteristic of said machine, a phase detector tube, means for operating said phase detector tube according to the frequency of said alternating current, a space discharge amplifier coupled to said phase detector for controlling said field winding to maintain the machine characteristic constant, and means comprising a resistance element shunted by a condenser in the output circuit of said detector tube for operating the amplifier tube to apply a relatively large corrective field excitation upon tendency of the machine characteristic to change and to gradually reduce the corrective excitation.

13. In a regulator system, a motor having a regulating field winding, a generator producing an alternating current having a frequency varying according to the motor speed, a phase detector tube, a Wheatstone bridge circuit having one arm thereof in the form of a tuned circuit, two opposite vertices of said bridge circuit being connected to said generator and the other two vertices being connected to the input circuit of said phase detector tube, means for supplying alternating potential to the plate of said tube from said generator, an amplifier space discharge device coupled to said detector tube for controlling said field winding to maintain the motor speed constant, and means in the output circuit of said phase detector tube and directly controlling said amplifier device for applying a large corrective excitation to said field winding upon tendency of the motor to change speed and for gradually reducing the corrective excitation.

14. In a regulator system, a motor having a regulating field winding, a generator operated by said motor to produce an alternating current having a frequency varying according to the motor speed, a three-element phase detector tube, a Wheatstone bridge circuit having one arm tuned to the frequency produced by the generator when the motor is operating at normal speed, two opposite vertices of said bridge being connected to said generator and the other two vertices being connected to the input circuit of the phase detector tube, a space discharge amplifier coupled to said detector tube for governing the excitation of said field winding to maintain the motor speed constant, and means comprising a resistance element shunted by a condenser in the output circuit of said phase detector tube for applying a relatively large corrective excitation to said field winding upon tendency of the motor to change speed and for gradually reducing the corrective excitation.

In witness whereof, I hereunto subscribe my name this 29th day of April, 1929.

EDMUND R. MORTON.